US006822751B1

United States Patent
Lu

(10) Patent No.: US 6,822,751 B1
(45) Date of Patent: Nov. 23, 2004

(54) METHOD AND SYSTEM FOR MONOCHROME MULTI-BEAM PRINTING WITH EDGE ENHANCEMENT

(75) Inventor: Ai-Chieh Lu, Taipei Hsien (TW)

(73) Assignee: Destiny Technology Corporation, Taipei (TW)

(*) Notice: Subject to any disclaimer, the term of this patent is extended or adjusted under 35 U.S.C. 154(b) by 0 days.

(21) Appl. No.: 09/465,193

(22) Filed: Dec. 10, 1999

(51) Int. Cl.$^7$ .............................................. G06F 15/00
(52) U.S. Cl. .................................... 358/1.1; 358/1.5
(58) Field of Search ........................ 358/1.1, 1.2, 1.5, 358/1.9, 1.12, 1.13, 1.14, 1.15; 382/190, 199, 205

(56) References Cited

U.S. PATENT DOCUMENTS

| | | | |
|---|---|---|---|
| 4,733,252 A | 3/1988 | Daniele et al. | 346/108 |
| 4,823,151 A | 4/1989 | Miura | 346/160 |
| 4,989,019 A | 1/1991 | Loce et al. | 346/108 |
| 5,014,124 A | 5/1991 | Fujisawa | |
| 5,029,108 A * | 7/1991 | Lung | 358/1.9 |
| 5,274,428 A | 12/1993 | Wong et al. | 355/326 |
| 5,387,983 A | 2/1995 | Sugiura et al. | |
| 5,387,985 A * | 2/1995 | Loce et al. | 358/447 |
| 5,396,584 A | 3/1995 | Lee et al. | |
| 5,432,535 A | 7/1995 | Andrews et al. | 347/242 |
| 5,459,587 A | 10/1995 | Fukushima | |
| 5,548,415 A | 8/1996 | Tanaka et al. | |
| 5,619,334 A | 4/1997 | Adams et al. | 358/298 |
| 5,745,153 A | 4/1998 | Kessler et al. | 347/241 |
| 5,764,377 A | 6/1998 | Nacman et al. | 358/444 |
| 5,872,573 A | 2/1999 | Adegeest | |
| 5,956,156 A | 9/1999 | Fukushima | |
| 6,026,184 A | 2/2000 | Fukushima | |
| 6,167,163 A | 12/2000 | Fukushima | |

FOREIGN PATENT DOCUMENTS

| | | |
|---|---|---|
| JP | 61157161 | 7/1986 |
| JP | 62100884 | 11/1987 |
| JP | 02084879 | 3/1990 |
| JP | 04362870 | 12/1992 |
| JP | 05006438 | 1/1993 |
| JP | 05091312 | 4/1993 |
| JP | 08051538 | 2/1996 |
| JP | 11305752 | 11/1999 |
| JP | 11355576 | 12/1999 |
| JP | 200011188 | 1/2000 |
| JP | 2001 309092 | 11/2001 |

* cited by examiner

*Primary Examiner*—Mark Wallerson
(74) *Attorney, Agent, or Firm*—Alan D. Kamrath; Nikolai & Mersereau, P.A.

(57) ABSTRACT

A system and a method provide edge enhancement for a printer engine which produces multiple laser beams for marking a corresponding number of scan lines on at least one photosensitive medium. A corresponding number of windows are created. Each window contains data of a matrix of dots centered at a to-be-processed dot located in a corresponding one of the scan lines. An edge enhancing device provides edge enhancement for the windows that are alternately outputted to the edge enhancing device by a multiplexer. The windows processed by the edge enhancing device are alternately outputted by a de-multiplexer to a number of modulators. Each modulator controls a corresponding one of the laser beams produced by the printer engine.

18 Claims, 2 Drawing Sheets

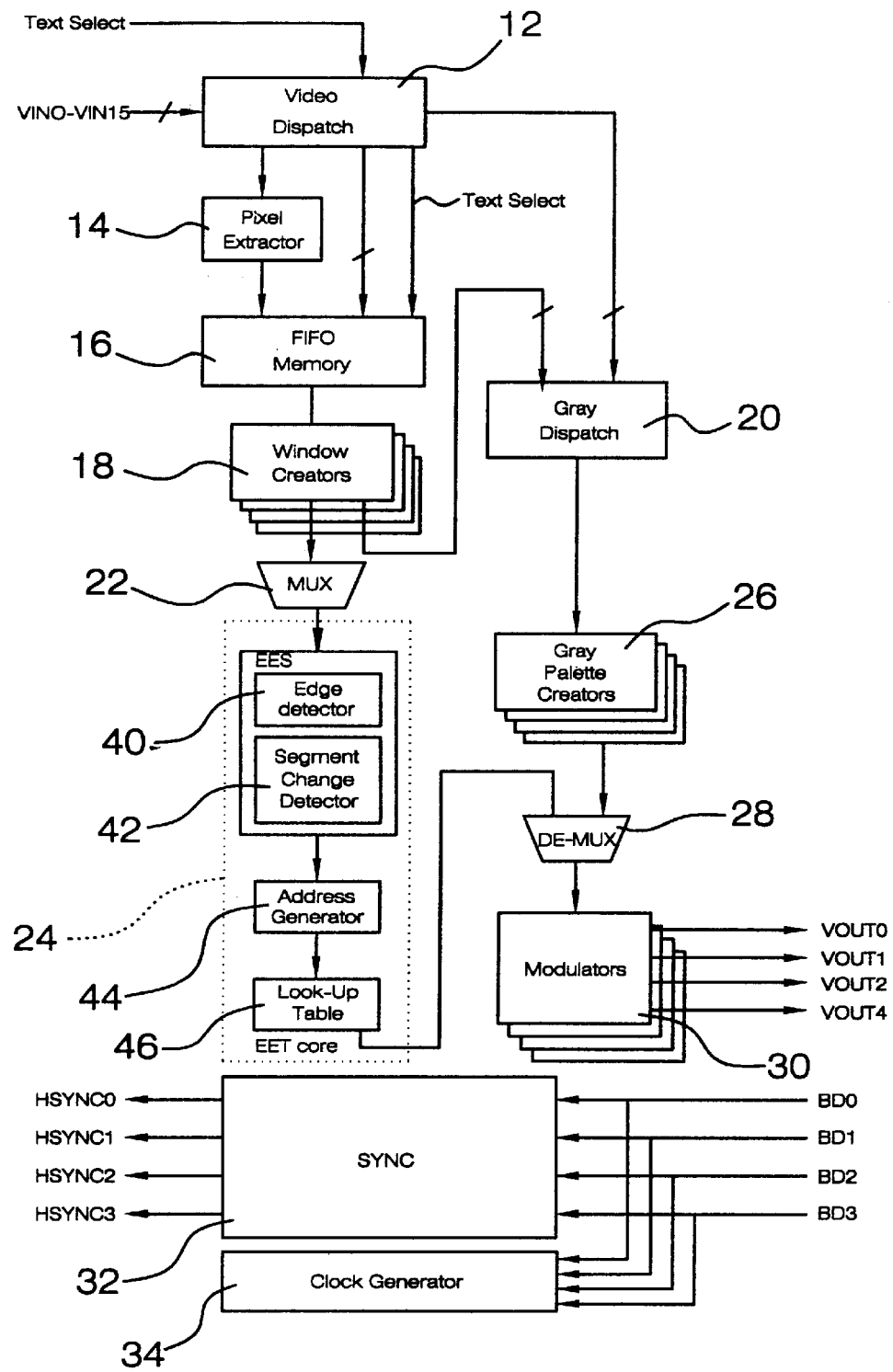
F I G . 1

METHOD AND SYSTEM FOR MONOCHROME MULTI-BEAM PRINTING WITH EDGE ENHANCEMENT

BACKGROUND OF THE INVENTION

1. Field of the Invention

The present invention relates to a method and system for providing monochrome multi-beam printing with edge enhancement.

2. Description of the Related Art

A wide variety of methods and devices have been proposed for enhancing printing result of text edge, and typical examples include: U.S. Pat. No. 5,029,108 to Lung issued on Jul. 2, 1991; U.S. Pat. No. 5,396,584 to Lee et al. issued on Mar. 7, 1995; and U.S. Pat. No. 5,619,334 to Adams et al. issued on Apr. 8, 1997. Also, a wide variety of methods and devices have been proposed for increasing the scanning and outputting speed of a printer engine, and typical examples include: U.S. Pat. No. 4,733,252 to Daniele et al. issued on Mar. 22, 1988; U.S. Pat. No. 4,823,151 to Miura issued on Apr. 18, 1989; U.S. Pat. No. 4,989,019 to Loce et al. issued on Jan. 29, 1991; U.S. Pat. No. 5,432,535 to Andrews et al. issued on Jul. 11, 1995; U.S. Pat. No. 5,745,153 to Kessler et al. issued on Apr. 28, 1998; and U.S. Pat. No. 5,764,377 to Nacman et al. issued on Jun. 9, 1998. Yet, it is found that the printing result of text edge cannot be improved when using multi-beam technique. The present invention is intended to provide a method and system to solve this problem.

SUMMARY OF THE INVENTION

It is a primary object of the present invention to provide a printing control system for providing monochrome multi-beam printing with edge enhancement.

It is another object of the present invention to provide a method for providing monochrome multi-beam printing with edge enhancement.

In accordance with the present invention, a system provides edge enhancement for a printer engine which produces multiple laser beams for marking a corresponding number of scan lines on at least one photosensitive medium. The system comprises:

a window creator means for creating a corresponding number of windows each containing data of a matrix of dots centered at a to-be-processed dot located in a corresponding one of the scan lines;

an edge enhancing device for providing edge enhancement for the windows;

a multiplexer for alternately outputting the windows to the edge enhancing device;

a plurality of modulators each adapted for controlling a corresponding one of the laser beams produced by the printer engine; and a de-multiplexer for alternately outputting the windows processed by the edge enhancing device to the modulators.

The multiplexer, the edge enhancing device, and the de-multiplexer operate at a frequency two times of that the window creator means and the modulators.

The printer engine may form four scan lines on four photosensitive media, respectively. Alternatively, the printer engine may form at least two scan lines on each of a plurality of photosensitive media.

In accordance with the present invention, a method provides edge enhancement for a printer engine which produces multiple laser beams for marking a corresponding number of scan lines on at least one photosensitive medium. The method comprises the following steps of:

creating a corresponding number of windows each containing data of a matrix of dots centered at a to-be-processed dot located in a corresponding one of the scan lines;

alternately outputting the windows to an edge enhancing device for providing edge enhancement for the windows; and alternately outputting the windows processed by the edge enhancing device to a plurality of modulators, each said modulator being adapted to control a corresponding one of the laser beams produced by the printer engine.

Other objects, advantages, and novel features of the invention will become more apparent from the following detailed description when taken in conjunction with the accompanying drawings.

BRIEF DESCRIPTION OF THE DRAWINGS

FIG. 1 is a block diagram of a printing control system in accordance with the present invention.

DETAILED DESCRIPTION OF THE PREFERRED EMBODIMENT

Figure 2:
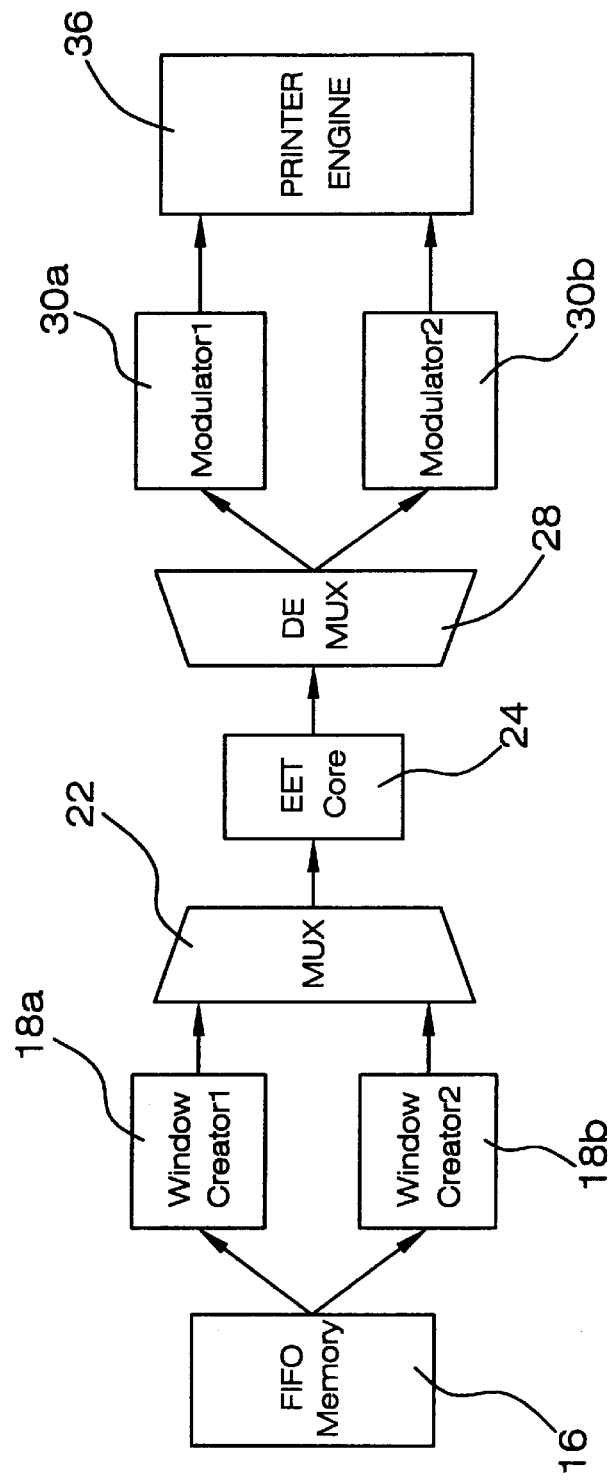
FIG. 2 is a block diagram illustrating a method for monochrome multi-beam printing with edge enhancement in accordance with the present invention.

Referring to FIGS. 1 and 2, a printing control system in accordance with the present invention provides monochrome multi-beam printing with edge enhancement. More specifically, the printing control system of the invention is used in a printer system that is connected to a host system (such as an external computer or word processor) and that uses at least two scanning beams for forming at least two scan lines on a photosensitive medium (not shown). The printing control system of the invention includes a video dispatch 12 for dispatching text data to be processed to a pixel extractor 14 and for dispatching image data to be processed to a gray dispatch 20. The image data to the gray dispatch 20 is processed by gray palette creators 26 and then outputted to a de-multiplexer 28, which is conventional and therefor not described in detail. A plurality of modulators 30 convert data from the de-multiplexer 28 into data readable by a printer engine (not shown in FIG. 1) for printing.

Text data in each data line from the video dispatch 12 are also fed to a FIFO (first-in-first-out) memory 16. A window creator means 18 creates a plurality of windows corresponding to a quantity of scanning beams. For each to-be-processed dot in a data line, the associated window contains data of a matrix of dots (e.g., 5×5 or 5×7) centered at the to-be-processed dot. The matrix data in the windows are alternately outputted by a multiplexer 22 to an edge enhancing device, e.g., an edge enhancement technique (EET) core 24 for providing edge enhanced printing for text edges. In this embodiment, the EET core 24 includes an edge enhancing sensor (not labeled) consisting of an edge detector 40 and a segment change detector 42, an address generator 44, and a look-up table 46. Nevertheless, it is appreciated that other EETs can be used to provide the required text edge enhancing effect.

After processing by the EET core 24, the text data are alternately outputted by the de-multiplexer 28 to the plurality of modulators 30 that are connected to a printer engine for printing. The printing control system further includes a synchronizing-impulse generator 32 and a clock generator 34, which are conventional and therefore not described in detail.

In order to fully understand the invention, an example of a printer system that uses two scanning beams for simultaneously forming two scan lines on a photosensitive medium will now be described with reference to FIGS. 1 and 2. Text data in each data line from the video dispatch 12 are fed to a FIFO (first-in-first-out) memory 16. The pixel extractor 14 converts an m-bit text (for a m×n matrix) to a 1-bit texts and the 1-bit text is stored in the FIFO memory 16. The window creator means 18 may include two window creators 18a and 18b for creating two windows. For each to-be-processed dot in a data line, the associated window contains a matrix of dots (e.g., 5×5 or 5×7) centered at the to-be-processed dot. The matrix data in the windows are alternately outputted by the multiplexer 22 to the EET core 24 for providing edge enhanced printing for text edges. After processing by the EET core 24, the data is alternately outputted by the de-multiplexer 28 to two modulators 30a and 30b that are connected to a printer engine 36 for printing. The multiplexer 22, the EET core 24, and the de-multiplexer 28 operate at a frequency two times that of the window creators 18a and 18b and the modulators 30a and 30b.

U.S. Pat. Nos. 5,029,108 and 5,396,584 disclose EET techniques used for enhancing text edges. U.S. Pat. No. 5,029,108 discloses a method for enhancing the displayed image of a print or display apparatus. The method comprises the steps of:

(a) generating a set of gradient masks each of which represents a plurality of edge segment transition conditions and includes a matrix of a×b cells each cell of which is assigned a numerical weight corresponding to the relative lightness or darkness of the corresponding pixel of an image having an edge segment passing through a center pixel of the matrix;

(b) generating a bit data signal including a plurality of data bits representative on a pixel by pixel basis of a bit map image to be printed or displayed;

(c) storing in temporary storage means a predetermined number of consecutive bits in a predetermined number of consecutive lines of said bit map image;

(d) selecting subsets of said bits forming a sample matrix of a×b bits, the central bit of each sample matrix being a candidate for modification;

(e) convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(f) generating a set of reference bit patterns each of which includes a sub-pattern of bits corresponding to one possible combination of bits of the same data state aligned in one or more edge segments, said pattern including an a×b matrix of bits, a first predetermined number of bits disposed adjacent one side of said matrix, and a second predetermined number of bits disposed adjacent another side of said matrix;

(g) comparing each said sample matrix having an edge segment passing through its central bit, a predetermined number of adjacent previously evaluated bits, and a predetermined number of adjacent yet to be evaluated bits to each pattern of at least a sub-set of said set of reference bit patterns;

(h) generating for each match found to a reference pattern including a predetermined type of segment transition, a modification signal for modifying the central bit of said sample matrix dependent upon the type of transition detected; and (i) using said modification signal to cause the print or display apparatus to develop a corresponding output.

U.S. Pat. No. 5,029,108 also discloses an apparatus for enhancing the output of a print or display device which produces a digitized image in dot matrix format. The apparatus comprises:

(a) means for generating a set of gradient masks each of which represents a plurality of edge segment transition conditions and includes a matrix of a×b cells each cell of which is assigned a numerical weight corresponding to the relative lightness or darkness of the corresponding pixel of an image having an edge segment passing through a center pixel of the matrix;

(b) means for generating a bit data signal including a plurality of data bits representative on a pixel by pixel basis of a bit map image to be printed or displayed;

(c) storage means for temporarily storing a predetermined number of consecutive bits in a predetermined number of consecutive lines of said bit map image;

(d) means for selecting subsets of said bits forming a sample matrix of a×b bits, the central bit of each sample matrix being a candidate for modification;

(e) means for convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(f) means for generating a set of reference bit patterns each of which includes a sub-pattern of bits corresponding to one possible combination of bits of the same data state aligned in one or more edge segments, said pattern including an a×b matrix of bits, a first predetermined number of bits disposed adjacent one side of said matrix, and a second predetermined number of bits disposed adjacent another side of said matrix;

(g) means for comparing each said sample matrix having an edge segment passing through its central bit, a predetermined number of adjacent previously evaluated bits, and a predetermined number of adjacent yet to be evaluated bits to each pattern of at least a sub-set of said set of reference bit patterns;

(h) means for generating, for each match found to a reference pattern including a predetermined type of segment transition, a modification signal for modifying the central bit of said sample matrix dependent upon the type of transition detected; and (i) means responsive to said modification signal for causing the print or display apparatus to develop a corresponding output.

U.S. Pat. No. 5,396,584 discloses a method for enhancing the displayed image of a print or display apparatus. The method comprises the steps of:

(a) generating a set of gradient masks each of which represents a plurality of edge segment transition conditions and includes a matrix of "a×b" cells, each cell of which is assigned a numerical weight corresponding to the relative lightness or darkness of the corresponding pixel of an image having an edge segment passing through a center pixel of the matrix;

(b) generating a data signal including a plurality of multi-bit data terms representative on a pixel-by-pixel basis of a bit map image to be printed or displayed;

(c) evaluating each said multi-bit data term, and if the value thereof is equal to or greater than a predetermined threshold value, then generating a data bit of a first state, and if the value is less than said threshold value, then generating a data bit of a second state;

(d) storing in temporary storage means a predetermined number of consecutive data bits in a predetermined number of consecutive lines of said bit map image;

(e) selecting subsets of said data bits forming a sample matrix of "a×b" data bits, the central bit of each sample matrix being a candidate for modification;

(f) convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(g) generating a set of reference bit patterns each of which includes a sub-pattern of bits corresponding to one possible combination of data bits of the same data state aligned in one or more edge segments, said pattern including an "a×b" matrix of data bits, a first predetermined number of data bits disposed adjacent one side of said matrix, and a second predetermined number of data bits disposed adjacent another side of said matrix;

(h) comparing each said sample matrix having an edge segment passing through its central bit, a predetermined number of adjacent previously evaluated data bits, and a predetermined number of adjacent yet to be evaluated data bits to each pattern of at least a sub-set of said set of reference bit patterns;

(i) generating for each match found to a reference bit pattern including a predetermined type of segment transition, a modification signal for modifying the central bit of said sample matrix dependent upon the type of transition detected;

(j) combining each said modification signal with its corresponding multi-bit data term to generate a compensated value signal;

(k) using each said compensated value signal to generate a compensated signal pulse which during at least a portion of its period is of a first data state, or is of a second data state for the duration of its period;

(l) using each said multi-bit data term to develop a corresponding percent gray signal; and (m) using each said compensated signal pulse of said first state to cause the print or display apparatus to develop a corresponding output, but if said compensated value signal is of said second state, then using the corresponding percent gray signal to cause the print or display apparatus to develop a corresponding output.

Another method disclosed in U.S. Pat. No. 5,396,584 for enhancing the displayed image of a gray scale print or display apparatus comprises the steps of:

(a) generating a set of gradient masks each of which represents a plurality of edge segment transition conditions and includes a matrix of "a×b" cells, each cell of which is assigned a numerical weight corresponding to the relative lightness or darkness of the corresponding pixel of an image having an edge segment passing through a center pixel of the matrix;

(b) generating a data signal including a plurality of multi-bit data terms representative on a pixel-by-pixel basis of a bit map image to be printed or displayed;

(c) evaluating each said multi-bit data term, and if the value thereof is equal to or greater than a predetermined threshold value, then generating a data bit of a first state, and if the value is less than said threshold value, then generating a data bit of a second state;

(d) storing in temporary storage means a predetermined number of consecutive data bits in a predetermined number of consecutive lines of said bit map image;

(e) selecting subsets of said data bits forming a sample matrix of "a×b" data bits, the central bit of each sample matrix being a candidate for modification;

(f) convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(g) generating a set of reference bit patterns each of which includes a sub-pattern of bits corresponding to one possible combination of data bits of the same data state aligned in one or more edge segments, said pattern including an "a×b" matrix of data bits, a first predetermined number of data bits disposed adjacent one side of said matrix, and a second predetermined number of data bits disposed adjacent another side of said matrix;

(h) comparing each said sample matrix having an edge segment passing through its central bit, a predetermined number of adjacent previously evaluated data bits, and a predetermined number of adjacent yet to be evaluated data bits to each pattern of at least a sub-set of said set of reference bit patterns;

(i) generating for each match found to a reference bit pattern including a predetermined type of segment transition, a modification signal for modifying the central bit of said sample matrix dependent upon the type of transition detected;

(j) combining each said modification signal with its corresponding multi-bit data term to generate a compensated value signal;

(k) using each said compensated signal pulse of said first state to cause the gray scale print or display apparatus to develop a corresponding output, but in the absence of a compensated value signal, using the multi-bit data term to cause the gray scale print or display apparatus to develop a corresponding output.

U.S. Pat. No. 5,396,584 also discloses an apparatus for enhancing the output of a print or display device which produces an image in dot matrix format. The apparatus comprises:

(a) means for generating a set of gradient masks each of which represents a plurality of to edge segment transition conditions and includes a matrix of "a×b" cells each cell of which is assigned a numerical weight corresponding to the relative lightness or darkness of the corresponding pixel of an image having an edge segment passing through a center pixel of the matrix;

(b) means for generating a data signal including a plurality of multi-bit data terms representative on a pixel-by-pixel basis of a bit map image to be printed or displayed;

(c) means for evaluating each said multi-bit data term, and if the value thereof is equal to or greater than a predetermined threshold value, then generating a data bit of a first state, and if the value is less than said threshold value, then generating a data bit of a second state;

(d) storage means for temporarily storing a predetermined number of consecutive data bits in a predetermined number of consecutive lines of said bit map image;

(e) means for selecting subsets of said data bits forming a sample matrix of "a×b" data bits, the central bit of each sample matrix being a candidate for modification;

(f) means for convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(g) means for generating a set of reference bit patterns each of which includes a sub-pattern of bits corresponding to one possible combination of bits of the same data state aligned in one or more edge segments, said pattern including an "a×b" matrix of bits, a first predetermined number of bits disposed adjacent one side of said matrix, and a second predetermined number of bits disposed adjacent another side of said matrix;

(h) means for comparing each said sample matrix having an edge segment passing through its central bit, a predetermined number of adjacent previously evaluated data bits, and a predetermined number of adjacent yet to be evaluated data bits to each pattern of at least a sub-set of said set of reference bit patterns;

(i) means for generating, for each match found to a reference bit pattern including a predetermined type of segment transition, a modification signal for modifying the central bit of said sample matrix dependent upon the type of transition detected;

(j) means for combining each said modification signal with its corresponding multi-bit data term to generate a compensated value signal;

(k) means responsive to said compensated value signal and operative to generate a compensated signal pulse which during at least a portion of its period is of a first data state, or is of a second data state for the duration of its period;

(l) means for converting each said multi-bit data term into a corresponding percent gray signal; and (m) means for determining whether or not each said compensated signal pulse is of said first data state and for transmitting each said compensated signal pulse of said first state to cause the print or display apparatus to develop a corresponding output, but if said compensated value signal is of said second state, then causing the corresponding percent gray signal to be transmitted to the print or display apparatus to develop a corresponding output.

Another apparatus disclosed in U.S. Pat. No. 5,396,584 for enhancing the output of a gray scale print or display device which produces an image in dot matrix format comprises:

(a) means for generating a set of gradient masks each of which represents a plurality of edge segment transition conditions and includes a matrix of "a×b" cells each cell of which is assigned a numerical weight corresponding to the relative lightness or darkness of the corresponding pixel of an image having an edge segment passing through a center pixel of the matrix;

(b) means for generating a data signal including a plurality of multi-bit data terms representative on a pixel-by-pixel basis of a bit map image to be printed or displayed;

(c) means for evaluating each said multi-bit data term, and if the value thereof is equal to or greater than a predetermined threshold value, then generating a data bit of a first state, and if the value is less than said threshold value, then generating a data bit of a second state;

(d) storage means for temporarily storing a predetermined number of consecutive data bits in a predetermined number of consecutive lines of said bit map image;

(e) means for selecting subsets of said data bits forming a sample matrix of "a×b" data bits, the central bit of each sample matrix being a candidate for modification;

(f) means for convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(g) means for generating a set of reference bit patterns each of which includes a sub-pattern of bits corresponding to one possible combination of bits of the same data state aligned in one or more edge segments, said pattern including an "a×b" matrix of bits, a first predetermined number of bits disposed adjacent one side of said matrix, and a second predetermined number of bits disposed adjacent another side of said matrix;

(h) means for comparing each said sample matrix having an edge segment passing through its central bit, a predetermined number of adjacent previously evaluated data bits, and a predetermined number of adjacent yet to be evaluated data bits to each pattern of at least a sub-set of said set of reference bit patterns;

(i) means for generating, for each match found to a reference bit pattern including a predetermined type of segment transition, a modification signal for modifying the central bit of said sample matrix dependent upon the type of transition detected;

(j) means for combining each said modification signal with its corresponding multi-bit data term to generate a compensated value signal; and (k) means responsive to each said compensated signal pulse and operative to cause the gray scale print or display apparatus to develop a corresponding output, but in the absence of a compensated value signal, responsive to the multi-bit date term and operative to cause the gray scale print or display apparatus to develop a corresponding output.

Contents of U.S. Pat. Nos. 5,029,108 and 5,396,584 are incorporated herein and form a part of the specification.

Thus, the printing control system in accordance with the present invention allows monochrome multi-beam printing with edge enhancement, i.e., the printing speed can be shortened without sacrificing the edge enhancing effect in the text edges. The printing control system in accordance with the present invention may be used in a printer system that uses two or more beams for simultaneously forming multiple scan lines on a photosensitive medium. The printing control system in accordance with the present invention may also be used in a printer system that has four photosensitive drums and that uses four beams each for forming a single scan line on an associated photosensitive drum, e.g., a color printer disclosed in U.S. Pat. No. 5,274,428 yet modified for monochrome printing. The printing control system in accordance with the present invention may also be used in a printer system that has four photosensitive drums and that uses eight beams each for forming two scan lines on an associated photosensitive drum. The printer engine may be a scan printer, copier, or any other machine that may print the processed data out.

Although the invention has been explained in relation to its preferred embodiment, it is to be understood that many other possible modifications and variations can be made without departing from the spirit and scope of the invention as hereinafter claimed.

What is claimed is:

1. A system for providing edge enhancement, with the system comprising:

a printer engine producing multiple laser beams for marking a corresponding number of scan lines on at least one photosensitive medium;

a window creator means for creating a corresponding number of windows each containing data of a matrix of dots centered at a to-be-processed dot located in a corresponding one of the scan lines;

an edge enhancing device for providing edge enhancement for the windows;

a multiplexer for alternately outputting the windows to the edge enhancing device;

a plurality of modulators each adapted for controlling a corresponding one of the laser beams produced by the printer engine; and a de-multiplexer for alternately outputting the windows processed by the edge enhancing device to the modulators;

wherein the edge enhancing device uses a method for enhancing a displayed image of a print or display apparatus, the method comprising the steps of:

(a) generating a set of gradient masks each of which represents a plurality of edge segment transition conditions and includes a matrix of a×b cells each cell of which is assigned a numerical weight corresponding to the relative lightness or darkness of the corresponding pixel of an image having an edge segment passing through a center pixel of the matrix;

(b) generating a bit data signal including a plurality of data bits representative on a pixel by pixel basis of a bit map image to be printed or displayed;

(c) storing in temporary storage means a predetermined number of consecutive bits in a predetermined number of consecutive lines of said bit map image;

(d) selecting subsets of said bits forming a sample matrix of a×b bits, the central bit of each sample matrix being a candidate for modification;

(e) convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(f) generating a set of reference bit patterns each of which includes a sub-pattern of bits corresponding to one possible combination of bits of the same data state aligned in one or more edge segments, said pattern including an a×b matrix of bits, a first predetermined number of bits disposed adjacent one side of said matrix, and a second predetermined number of bits disposed adjacent another side of said matrix;

(g) comparing each said sample matrix having an edge segment passing through its central bit, a predetermined number of adjacent previously evaluated bits, and a predetermined number of adjacent yet to be evaluated bits to each pattern of at least a sub-set of said set of reference bit patterns;

(h) generating for each match found to a reference pattern including a predetermined type of segment transition, a modification signal for modifying the central bit of said sample matrix dependent upon the type of transition detected; and (i) using said modification signal to cause the print or display apparatus to develop a corresponding output.

2. The system as claimed in claim 1, wherein the multiplexer, the edge enhancing device, and the de-multiplexer operate at a frequency two times that of the window creator means and the modulators.

3. The system as claimed in claim 1, wherein the printer engine forms four scan lines on four photosensitive media, respectively.

4. The system as claimed in claim 1, wherein the printer engine forms at least two scan lines on each of a plurality of photosensitive media.

5. A system for providing edge enhancement, with the system comprising:

a printer engine producing multiple laser beams for marking a corresponding number of scan lines on at least one photosensitive medium;

a window creator means for creating a corresponding number of windows each containing data of a matrix of dots centered at a to-be-processed dot located in a corresponding one of the scan lines;

an edge enhancing device for providing edge enhancement for the windows;

a multiplexer for alternately outputting the windows to the edge enhancing device;

a plurality of modulators each adapted for controlling a corresponding one of the laser beams produced by the printer engine; and a de-multiplexer for alternately outputting the windows processed by the edge enhancing device to the modulators;

wherein the edge enhancing device is provided for enhancing output of a print or display device which produces a digitized image in dot matrix format, the edge enhancing device comprising:

(a) means for generating a set of gradient masks each of which represents a plurality of edge segment transition conditions and includes a matrix of a×b cells each cell of which is assigned a numerical weight corresponding to the relative lightness or darkness of the corresponding pixel of an image having an edge segment passing through a center pixel of the matrix;

(b) means for generating a bit data signal including a plurality of data bits representative on a pixel by pixel basis of a bit map image to be printed or displayed;

(c) storage means for temporarily storing a predetermined number of consecutive bits in a predetermined number of consecutive lines of said bit map image;

(d) means for selecting subsets of said bits forming a sample matrix of a×b bits, the central bit of each sample matrix being a candidate for modification;

(e) means for convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(f) means for generating a set of reference bit patterns each of which includes a sub-pattern of bits corresponding to one possible combination of bits of the same data state aligned in one or more edge segments, said pattern including an a×b matrix of bits, a first predetermined number of bits disposed adjacent one side of said matrix, and a second predetermined number of bits disposed adjacent another side of said matrix;

(g) means for comparing each said sample matrix having an edge segment passing through its central bit, a predetermined number of adjacent previously evaluated bits, and a predetermined number of adjacent yet to be evaluated bits to each pattern of at least a sub-set of said set of reference bit patterns;

(h) means for generating, for each match found to a reference pattern including a predetermined type of segment transition, a modification signal for modifying the central bit of said sample matrix dependent upon the type of transition detected; and (i) means responsive to said modification signal for causing the print or display apparatus to develop a corresponding output.

6. A system for providing edge enhancement, with the system comprising:

a printer engine producing multiple laser beams for marking a corresponding number of scan lines on at least one photosensitive medium;

a window creator means for creating a corresponding number of windows each containing data of a matrix of dots centered at a to-be-processed dot located in a corresponding one of the scan lines;

an edge enhancing device for providing edge enhancement for the windows;

a multiplexer for alternately outputting the windows to the edge enhancing device;

a plurality of modulators each adapted for controlling a corresponding one of the laser beams produced by the printer engine; and a de-multiplexer for alternately outputting the windows processed by the edge enhancing device to the modulators;

wherein the edge enhancing device uses a method for enhancing displayed image of a print or display apparatus, the method comprising the steps of:

(a) generating a set of gradient masks each of which represents a plurality of edge segment transition conditions and includes a matrix of "a×b" cells, each cell of which is assigned a numerical weight corresponding to the relative lightness or darkness of the corresponding pixel of an image having an edge segment passing through a center pixel of the matrix;

(b) generating a data signal including a plurality of multi-bit data terms representative on a pixel-by-pixel basis of a bit map image to be printed or displayed;

(c) evaluating each said multi-bit data term, and if the value thereof is equal to or greater than a predetermined threshold value, then generating a data bit of a first state, and if the value is less than said threshold value, then generating a data bit of a second state;

(d) storing in temporary storage means a predetermined number of consecutive data bits in a predetermined number of consecutive lines of said bit map image;

(e) selecting subsets of said data bits forming a sample matrix of "a×b" data bits, the central bit of each sample matrix being a candidate for modification;

(f) convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(g) generating a set of reference bit patterns each of which includes a sub-pattern of bits corresponding to one possible combination of data bits of the same data state aligned in one or more edge segments, said pattern including an "a×b" matrix of data bits, a first predetermined number of data bits disposed adjacent one side of said matrix, and a second predetermined number of data bits disposed adjacent another side of said matrix;

(h) comparing each said sample matrix having an edge segment passing through its central bit, a predetermined number of adjacent previously evaluated data bits, and a predetermined number of adjacent yet to be evaluated data bits to each pattern of at least a sub-set of said set of reference bit patterns;

(i) generating for each match found to a reference bit pattern including a predetermined type of segment transition, a modification signal for modifying the central bit of said sample matrix dependent upon the type of transition detected;

(j) combining each said modification signal with its corresponding multi-bit data term to generate a compensated value signal;

(k) using each said compensated value signal to generate a compensated signal pulse which during at least a portion of its period is of a first data state, or is of a second data state for the duration of its period;

(l) using each said multi-bit data term to develop a corresponding percent gray signal; and (m) using each said compensated signal pulse of said first state to cause the print or display apparatus to develop a corresponding output, but if said compensated value signal is of said second state, then using the corresponding percent gray signal to cause the print or display apparatus to develop a corresponding output.

7. A system for providing edge enhancement, with the system comprising:

a printer engine producing multiple laser beams for marking a corresponding number of scan lines on at least one photosensitive medium;

a window creator means for creating a corresponding number of windows each containing data of a matrix of dots centered at a to-be-processed dot located in a corresponding one of the scan lines;

an edge enhancing device for providing edge enhancement for the windows;

a multiplexer for alternately outputting the windows to the edge enhancing device;

a plurality of modulators each adapted for controlling a corresponding one of the laser beams produced by the printer engine; and a de-multiplexer for alternately outputting the windows processed by the edge enhancing device to the modulators;

wherein the edge enhancing device uses a method for enhancing a displayed image of a gray scale print or display apparatus, the method comprising the steps of:

(a) generating a set of gradient masks each of which represents a plurality of edge segment transition conditions and includes a matrix of "a×b" cells, each cell of which is assigned a numerical weight corresponding to the relative lightness or darkness of the corresponding pixel of an image having an edge segment passing through a center pixel of the matrix;

(b) generating a data signal including a plurality of multi-bit data terms representative on a pixel-by-pixel basis of a bit map image to be printed or displayed;

(c) evaluating each said multi-bit data term, and if the value thereof is equal to or greater than a predetermined threshold value, then generating a data bit of a first state, and if the value is less than said threshold value, then generating a data bit of a second state;

(d) storing in temporary storage means a predetermined number of consecutive data bits in a predetermined number of consecutive lines of said bit map image;

(e) selecting subsets of said data bits forming a sample matrix of "a×b" data bits, the central bit of each sample matrix being a candidate for modification;

(f) convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(g) generating a set of reference bit patterns each of which includes a sub-pattern of bits corresponding to one possible combination of data bits of the same data state aligned in one or more edge segments, said pattern including an "a×b" matrix of data bits, a first predetermined number of data bits disposed adjacent one side of said matrix, and a second predetermined number of data bits disposed adjacent another side of said matrix;

(h) comparing each said sample matrix having an edge segment passing through its central bit, a predetermined number of adjacent previously evaluated data bits, and a predetermined number of adjacent yet to be evaluated data bits to each pattern of at least a sub-set of said set of reference bit patterns;

(i) generating for each match found to a reference bit pattern including a predetermined type of segment transition, a modification signal for modifying the central bit of said sample matrix dependent upon the type of transition detected;

(j) combining each said modification signal with its corresponding multi-bit data term to generate a compensated value signal; and (k) using each said compensated signal pulse of said first state to cause the gray scale print or display apparatus to develop a corresponding output, but in the absence of a compensated value signal, using the multi-bit date term to cause the gray scale print or display apparatus to develop a corresponding output.

8. A system for providing edge enhancement, with the system comprising:

a printer engine producing multiple laser beams for marking a corresponding number of scan lines on at least one photosensitive medium;

a window creator means for creating a corresponding number of windows each containing data of a matrix of dots centered at a to-be-processed dot located in a corresponding one of the scan lines;

an edge enhancing device for providing edge enhancement for the windows;

a multiplexer for alternately outputting the windows to the edge enhancing device;

a plurality of modulators each adapted for controlling a corresponding one of the laser beams produced by the printer engine; and a de-multiplexer for alternately outputting the windows processed by the edge enhancing device to the modulators;

wherein the edge enhancing device is provided for enhancing output of a print or display device which produces an image in dot matrix format, the edge enhancing device comprising:

(a) means for generating a set of gradient masks each of which represents a plurality of edge segment transition conditions and includes a matrix of "a×b" cells each cell of which is assigned a numerical weight corresponding to the relative lightness or darkness of the corresponding pixel of an image having an edge segment passing through a center pixel of the matrix;

(b) means for generating a data signal including a plurality of multi-bit data terms representative on a pixel-by-pixel basis of a bit map image to be printed or displayed;

(c) means for evaluating each said multi-bit data term, and if the value thereof is equal to or greater than a predetermined threshold value, then generating a data bit of a first state, and if the value is less than said threshold value, then generating a data bit of a second state;

(d) storage means for temporarily storing a predetermined number of consecutive data bits in a predetermined number of consecutive lines of said bit map image;

(e) means for selecting subsets of said data bits forming a sample matrix of "a×b" data bits, the central bit of each sample matrix being a candidate for modification;

(f) means for convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(g) means for generating a set of reference bit patterns each of which includes a sub-pattern of bits corresponding to one possible combination of bits of the same data state aligned in one or more edge segments, said pattern including an "a×b" matrix of bits, a first predetermined number of bits disposed adjacent one side of said matrix, and a second predetermined number of bits disposed adjacent another side of said matrix;

(h) means for comparing each said sample matrix having an edge segment passing through its central bit, a predetermined number of adjacent previously evaluated data bits, and a predetermined number of adjacent yet to be evaluated data bits to each pattern of at least a sub-set of said set of reference bit patterns;

(i) means for generating, for each match found to a reference bit pattern including a predetermined type of segment transition, a modification signal for modifying the central bit of said sample matrix dependent upon the type of transition detected;

(j) means for combining each said modification signal with its corresponding multi-bit data term to generate a compensated value signal;

(k) means responsive to said compensated value signal and operative to generate a compensated signal pulse which during at least a portion of its period is of a first data state, or is of a second data state for the duration of its period;

(l) means for converting each said multi-bit data term into a corresponding percent gray signal; and (m) means for determining whether or not each said compensated signal pulse is of said first data state and for transmitting each said compensated signal pulse of said first state to cause the print or display apparatus to develop a corresponding output, but if said compensated signal is of said second state, then causing the corresponding percent gray signal to be transmitted to the print or display apparatus to develop a corresponding output.

9. A system for providing edge enhancements with the system comprising:

a printer engine producing multiple laser beams for marking a corresponding number of scan lines on at least one photosensitive medium;

a window creator means for creating a corresponding number of windows each containing data of a matrix of dots centered at a to-be-processed dot located in a corresponding one of the scan lines;

an edge enhancing device for providing edge enhancement for the windows;

a multiplexer for alternately outputting the windows to the edge enhancing device;

a plurality of modulators each adapted for controlling a corresponding one of the laser beams produced by the printer engine; and a de-multiplexer for alternately outputting the windows processed by the edge enhancing device to the modulators;

wherein the edge enhancing device is provided for enhancing output of a gray scale print or display device which produces an image in dot matrix format, the edge enhancing device comprising:

(a) means for generating a set of gradient masks each of which represents a plurality of edge segment transition conditions and includes a matrix of "a×b" cells each cell of which is assigned a numerical weight corresponding to the relative lightness or darkness of the corresponding pixel of an image having an edge segment passing through a center pixel of the matrix;

(b) means for generating a data signal including a plurality of multi-bit data terms representative on a pixel-by-pixel basis of a bit map image to be printed or displayed;

(c) means for evaluating each said multi-bit data term, and if the value thereof is equal to or greater than a predetermined threshold value, then generating a data bit of a first state, if the value is less than said threshold value, then generating a data bit of a second state;

(d) storage means for temporarily storing a predetermined number of consecutive data bits in a predetermined number of consecutive lines of said bit map image;

(e) means for selecting subsets of said data bits forming a sample matrix of "a×b" data bits, the central bit of each sample matrix being a candidate for modification;

(f) means for convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(g) means for generating a set of reference bit patterns each of which includes a sub-pattern of bits corresponding to one possible combination of bits of the same data state aligned in one or more edge segments, said pattern including an "a×b" matrix of bits, a first predetermined number of bits disposed adjacent one side of said matrix, and a second predetermined number of bits disposed adjacent another side of said matrix;

(h) means for comparing each said sample matrix having an edge segment passing through its central bit, a predetermined number of adjacent previously evaluated data bits, and a predetermined number of adjacent yet to be evaluated data bits to each pattern of at least a sub-set of said set of reference bit patterns;

(i) means for generating, for each match found to a reference bit pattern including a predetermined type of segment transition, a modification signal for modifying the central bit of said sample matrix dependent upon the type of transition detected;

(j) means for combining each said modification signal with its corresponding multi-bit data term to generate a compensated value signal; and (k) means responsive to each said compensated signal pulse and operative to cause a gray scale print or display apparatus to develop a corresponding output, but in the absence of a compensated value signal, responsive to the multi-bit data term and operative to cause the gray scale print or display apparatus to develop a corresponding output.

10. A method for providing edge enhancement comprising:

producing multiple laser beams for marking a corresponding number of scan lines on at least one photosensitive medium by a printer engine;

creating a corresponding number of windows each containing data of a matrix of dots centered at a to-be-processed dot located in a corresponding one of the scan lines;

alternately outputting the windows to an edge enhancing device for providing edge enhancement for the windows; and alternately outputting the windows processed by the edge enhancing device to a plurality of modulators, each said modulator being adapted to control a corresponding one of the laser beams produced by the printer engine;

wherein the edge enhancing device uses a method for enhancing a displayed image of a print or display apparatus, the method used by the edge enhancing device comprising the steps of:

(a) generating a set of gradient masks each of which represents a plurality of edge segment transition conditions and includes a matrix of a×b cells each cell of which is assigned a numerical weight corresponding to the relative lightness or darkness of the corresponding pixel of an image having an edge segment passing through a center pixel of the matrix;

(b) generating a bit data signal including a plurality of data bits representative on a pixel by pixel basis of a bit map image to be printed or displayed;

(c) storing in temporary storage means a predetermined number of consecutive bits in a predetermined number of consecutive lines of said bit map image;

(d) selecting subsets of said bits forming a sample matrix of a×b bits, the central bit of each sample matrix being a candidate for modification;

(e) convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(f) generating a set of reference bit patterns each of which includes a sub-pattern of bits corresponding to one possible combination of bits of the same data state aligned in one or more edge segments, said pattern including an a×b matrix of bits, a first predetermined number of bits disposed adjacent one side of said matrix, and a second predetermined number of bits disposed adjacent another side of said matrix;

(g) comparing each said sample matrix having an edge segment passing through its central bit, a predetermined number of adjacent previously evaluated bits, and a predetermined number of adjacent yet to be evaluated bits to each pattern of at least a sub-set of said set of reference bit patterns;

(h) generating for each match found to a reference pattern including a predetermined type of segment transition, a modification signal for modifying the central bit of said sample matrix dependent upon the type of transition detected; and (i) using said modification signal to cause the print or display apparatus to develop a corresponding output.

11. The method as claimed in claim 10, wherein the windows are alternately outputted to the edge enhancing device by a multiplexer and the windows processed by the edge enhancing device are alternately outputted to the modulators by a de-multiplexer, and wherein the multiplexer, the edge enhancing device, and the de-multiplexer operate at a frequency two times that of the window creator means and the modulators.

12. The method as claimed in claim 10, wherein the printer engine forms four scan lines on four photosensitive media, respectively.

13. The method as claimed in claim 10, wherein the printer engine forms at least two scan lines on each of a plurality of photosensitive media.

14. A method for providing edge enhancement comprising:
producing multiple laser beams for marking a corresponding number of scan lines on at least one photosensitive medium by a printer engine;
creating a corresponding number of windows each containing data of a matrix of dots centered at a to-be-processed dot located in a corresponding one of the scan lines;

alternately outputting the windows to an edge enhancing device for providing edge enhancement for the windows; and alternately outputting the windows processed by the edge enhancing device to a plurality of modulators, each said modulator being adapted to control a corresponding one of the laser beams produced by the printer engine;

wherein the edge enhancing device is provided for enhancing output of a print or display device which produces a digitized image in dot matrix format, the edge enhancing device comprising:

(a) means for generating a set of gradient masks each of which represents a plurality of edge segment transition conditions and includes a matrix of a×b cells each cell of which is assigned a numerical weight corresponding to the relative lightness or darkness of the corresponding pixel of an image having an edge segment passing through a center pixel of the matrix;

(b) means for generating a bit data signal including a plurality of data bits representative on a pixel by pixel basis of a bit map image to be printed or displayed;

(c) storage means for temporarily storing a predetermined number of consecutive bits in a predetermined number of consecutive lines of said bit map image;

(d) means for selecting subsets of said bits forming a sample matrix of a×b bits, the central bit of each sample matrix being a candidate for modification;

(e) means for convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(f) means for generating a set of reference bit patterns each of which includes a sub-pattern of bits corresponding to one possible combination of bits of the same data state aligned in one or more edge segments, said pattern including an a×b matrix of bits, a first predetermined number of bits disposed adjacent one side of said matrix, and a second predetermined number of bits disposed adjacent another side of said matrix;

(g) means for comparing each said sample matrix having an edge segment passing through its central bit, a predetermined number of adjacent previously evaluated bits, and a predetermined number of adjacent yet to be evaluated bits to each pattern of at least a sub-set of said set of reference bit patterns;

(h) means for generating, for each match found to a reference pattern including a predetermined type of segment transition, a modification signal for modifying the central bit of said sample matrix dependent upon the type of transition detected; and (i) means responsive to said modification signal for causing the print or display apparatus to develop a corresponding output.

15. A method for providing edge enhancement comprising:
producing multiple laser beams for marking a corresponding number of scan lines on at least one photosensitive medium by a printer engine;
creating a corresponding number of windows each containing data of a matrix of dots centered at a to-be-processed dot located in a corresponding one of the scan lines;

alternately outputting the windows to an edge enhancing device for providing edge enhancement for the windows; and alternately outputting the windows processed by the edge enhancing device to a plurality of modulators, each said modulator being adapted to control a corresponding one of the laser beams produced by the printer engine;

wherein the edge enhancing device uses a method for enhancing displayed image of a print or display apparatus, the method used by the edge enhancing device comprising the steps of:

(a) generating a set of gradient masks each of which represents a plurality of edge segment transition conditions and includes a matrix of "a×b" cells, each cell of which is assigned a numerical weight corresponding to the relative lightness or darkness of the corresponding pixel of an image having an edge segment passing through a center pixel of the matrix;

(b) generating a data signal including a plurality of multi-bit data terms representative on a pixel-by-pixel basis of a bit map image to be printed or displayed;

(c) evaluating each said multi-bit data term, and if the value thereof is equal to or greater than a predetermined threshold value, then generating a data bit of a first state, and if the value is less than said threshold value, then generating a data bit of a second state;

(d) storing in temporary storage means a predetermined number of consecutive data bits in a predetermined number of consecutive lines of said bit map image;

(e) selecting subsets of said data bits forming a sample matrix of "a×b" data bits, the central bit of each sample matrix being a candidate for modification;

(f) convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(g) generating a set of reference bit patterns each of which includes a sub-pattern of bits corresponding to one possible combination of data bits of the same data state aligned in one or more edge segments, said pattern including an "a×b" matrix of data bits, a first predetermined number of data bits disposed adjacent one side of said matrix, and a second predetermined number of data bits disposed adjacent another side of said matrix;

(h) comparing each said sample matrix having an edge segment passing through its central bit, a predetermined number of adjacent previously evaluated data bits, and a predetermined number of adjacent yet to be evaluated data bits to each pattern of at least a sub-set of said set of reference bit patterns;

(i) generating for each match found to a reference bit pattern including a predetermined type of segment transition, a modification signal for modifying the central bit of said sample matrix dependent upon the type of transition detected;

(j) combining each said modification signal with its corresponding multi-bit data term to generate a compensated value signal;

(k) using each said compensated value signal to generate a compensated signal pulse which during at least a portion of its period is of a first data state, or is of a second data state for the duration of its period;

(l) using each said multi-bit data term to develop a corresponding percent gray signal; and (m) using each said compensated signal pulse of said first state to cause the print or display apparatus to develop a corresponding output, but if said compensated value signal is of said second state, then using the corresponding percent gray signal to cause the print or display apparatus to develop a corresponding output.

16. A method for providing edge enhancement comprising:

producing multiple laser beams for marking a corresponding number of scan lines on at least one photosensitive medium by a printer engine;

creating a corresponding number of windows each containing data of a matrix of dots centered at a to-be-processed dot located in a corresponding one of the scan lines;

alternately outputting the windows to an edge enhancing device for providing edge enhancement for the windows; and alternately outputting the windows processed by the edge enhancing device to a plurality of modulators, each said modulator being adapted to control a corresponding one of the laser beams produced by the printer engine;

wherein the edge enhancing device uses a method for enhancing displayed image of a gray scale print or display apparatus, the method used by the edge enhancing device comprising the steps of:

(a) generating a set of gradient masks each of which represents a plurality of edge segment transition conditions and includes a matrix of "a×b" cells, each cell of which is assigned a numerical weight corresponding to the relative lightness or darkness of the corresponding pixel of an image having an edge segment passing through a center pixel of the matrix;

(b) generating a data signal including a plurality of multi-bit data terms representative on a pixel-by-pixel basis of a bit map image to be printed or displayed;

(c) evaluating each said multi-bit data term, and if the value thereof is equal to or greater than a predetermined threshold value, then generating a data bit of a first state, and if the value is less than said threshold value, then generating a data bit of a second state;

(d) storing in temporary storage means a predetermined number of consecutive data bits in a predetermined number of consecutive lines of said bit map image;

(e) selecting subsets of said data bits forming a sample matrix of "a×b" data bits, the central bit of each sample matrix being a candidate for modification;

(f) convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(g) generating a set of reference bit patterns each of which includes a sub-pattern of bits corresponding to one possible combination of data bits of the same data state aligned in one or more edge segments, said pattern including an "a×b" matrix of data bits, a first predetermined number of data bits disposed adjacent one side of said matrix, and a second predetermined number of data bits disposed adjacent another side of said matrix;

(h) comparing each said sample matrix having an edge segment passing through its central bit, a predetermined number of adjacent previously evaluated data bits, and a predetermined number of adjacent yet to be evaluated data bits to each pattern of at least a sub-set of said set of reference bit patterns;

(i) generating for each match found to a reference bit pattern including a predetermined type of segment transition, a modification signal for modifying the central bit of said sample matrix dependent upon the type of transition detected;

(j) combining each said modification signal with its corresponding multi-bit data term to generate a compensated value signal; and (k) using each said compensated signal pulse of said first state to cause the gray scale print or display apparatus to develop a corresponding output, but in the absence of a compensated value signal, using the multi-bit date term to cause the gray scale print or display apparatus to develop a corresponding output.

17. A method for providing edge enhancement comprising:

producing multiple laser beams for marking a corresponding number of scan lines on at least one photosensitive medium by a printer engine;

creating a corresponding number of windows each containing data of a matrix of dots centered at a to-be-processed dot located in a corresponding one of the scan lines;

alternately outputting the windows to an edge enhancing device for providing edge enhancement for the windows; and alternately outputting the windows processed by the edge enhancing device to a plurality of modulators, each said modulator being adapted to control a corresponding one of the laser beams produced by the printer engine;

wherein the edge enhancing device is provided for enhancing output of a print or display device which produces an image in dot matrix format, the edge enhancing device comprising:

(a) means for generating a set of gradient masks each of which represents a plurality of edge segment transition conditions and includes a matrix of "a×b" cells each cell of which is assigned a numerical weight corresponding to the relative lightness or darkness of the corresponding pixel of an image having an edge segment passing through a center pixel of the matrix;

(b) means for generating a data signal including a plurality of multi-bit data terms representative on a pixel-by-pixel basis of a bit map image to be printed or displayed;

(c) means for evaluating each said multi-bit data term, and if the value thereof is equal to or greater than a predetermined threshold value, then generating a data bit of a first state, and if the value is less than said threshold value, then generating a data bit of a second state;

(d) storage means for temporarily storing a predetermined number of consecutive data bits in a predetermined number of consecutive lines of said bit map image;

(e) means for selecting subsets of said data bits forming a sample matrix of "a×b" data bits, the central bit of each sample matrix being a candidate for modification;

(f) means for convolving each said sample matrix with each said gradient mask to detect those sample matrices having edge segment passing through their central bit, said edge segment being defined as a series of adjacent aligned data bits of the same data state forming a straight line having a single slope, and to determine the direction of a gradient change;

(g) means for generating a set of reference bit patterns each of which includes a sub-pattern of bits corresponding to one possible combination of bits of the same data state aligned in one or more edge segments, said pattern including an "a×b" matrix of bits, a first predetermined number of bits disposed adjacent one side of said matrix, and a second predetermined number of bits disposed adjacent another side of said matrix;

(h) means for comparing each said sample matrix having an edge segment passing through its central bit, a predetermined number of adjacent previously evaluated data bits, and a predetermined number of adjacent yet to be evaluated data bits to each pattern of at least a sub-set of said set of reference bit patterns;

(i) means for generating, for each match found to a reference bit pattern including a predetermined type of segment transition, a modification signal for modifying the central bit of said sample matrix dependent upon the type of transition detected;

(j) means for combining each said modification signal with its corresponding multi-bit data term to generate a compensated value signal;

(k) means responsive to said compensated value signal and operative to generate a compensated signal pulse which during at least a portion of its period is of a first data state, or is of a second data state for the duration of its period;

(l) means for converting each said multi-bit data term into a corresponding percent gray signal; and (m) means for determining whether or not each said compensated signal pulse is of said first data state and for transmitting each said compensated signal pulse of said first state to cause the print or display apparatus to develop a corresponding output, but if said compensated signal is of said second state, then causing the corresponding percent gray signal to be transmitted to the print or display apparatus to develop a corresponding output.

18. A method for providing edge enhancement comprising:

producing multiple laser beams for marking a corresponding number of scan lines on at least one photosensitive medium by a printer engine;

creating a corresponding number of windows each containing data of a matrix of dots centered at a to-be-processed dot located in a corresponding one of the scan lines;

alternately outputting the windows to an edge enhancing device for providing edge enhancement for the windows; and alternately outputting the windows processed by the edge enhancing device to a plurality of modulators, each said modulator being adapted to control a corresponding one of the laser beams produced by the printer engine;

wherein the edge enhancing device is provided for enhancing output of a gray scale print or display device which produces an image in dot matrix format, the edge enhancing device comprising:

(a) means for generating a set of gradient masks each of which represents a plurality of edge segment transition conditions and includes a matrix of "a×b" cells each cell of which is assigned a numerical weight corresponding to the relative lightness or darkness of the corresponding pixel of an image having an edge segment passing through a center pixel of the matrix;

(b) means for generating a data signal including a plurality of multi-bit data terms representative on a pixel-by-pixel basis of a bit map image to be printed or displayed;

(c) means for evaluating each said multi-bit data term, and if the value thereof is equal to or greater than a predetermined threshold value, then generating a data bit of a first state, and if the value is less than said threshold value, then generating a data bit of a second state;

(d) storage means for temporarily storing a predetermined number of consecutive data bits in a predetermined number of consecutive lines of said bit map image;

(e) means for selecting subsets of said data bits forming a sample matrix of "a×b" data bits, the central bit of each sample matrix being a candidate for modification;

(f) means for convolving each said sample matrix with each said gradient mask to detect those sample matrices having an edge segment passing through their central bit, said edge segment being defined as a series of adjacent aligned data bits of the same data state forming a straight line having a single slope, and to determine the direction of a gradient change;

(g) means for generating a set of reference bit patterns each of which includes a sub-pattern of bits corresponding to one possible combination of bits of the same data state aligned in one or more edge segments, said pattern including an "a×b" matrix of bits, a first predetermined number of bits disposed adjacent one side of said matrix, and a second predetermined number of bits disposed adjacent another side of said matrix;

(h) means for comparing each said sample matrix having an edge segment passing through its central bit, a predetermined number of adjacent previously evaluated data bits, and a predetermined number of adjacent yet to be evaluated data bits to each pattern of at least a sub-set of said set of reference bit patterns;

(i) means for generating, for each match found to a reference bit pattern including a predetermined type of segment transition, a modification signal for modifying the central bit of said sample matrix dependent upon the type of transition detected;

(j) means for combining each said modification signal with its corresponding multi-bit data term to generate a compensated value signal; and (k) means responsive to each said compensated signal pulse and operative to cause the gray scale print or display apparatus to develop a corresponding output, but in the absence of a compensated value signal, responsive to the multi-bit data term and operative to cause the gray scale print or display apparatus to develop a corresponding output.

* * * * *